US012715627B2

(12) United States Patent
Nakravesh et al.

(10) Patent No.: US 12,715,627 B2
(45) Date of Patent: Aug. 25, 2026

(54) HYBRID EXPLORATION AND INSPECTION ROBOT

(71) Applicant: ARIZONA BOARD OF REGENTS ON BEHALF OF THE UNIVERSITY OF ARIZONA, Tucson, AZ (US)

(72) Inventors: Parviz E. Nakravesh, Tucson, AZ (US); Sahand Sabet, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 325 days.

(21) Appl. No.: 18/039,459

(22) PCT Filed: Nov. 30, 2021

(86) PCT No.: PCT/US2021/061242
§ 371 (c)(1),
(2) Date: May 30, 2023

(87) PCT Pub. No.: WO2022/115797
PCT Pub. Date: Jun. 2, 2022

(65) Prior Publication Data

US 2024/0002074 A1 Jan. 4, 2024

Related U.S. Application Data

(60) Provisional application No. 63/119,422, filed on Nov. 30, 2020.

(51) Int. Cl.
*B64U 30/30* (2023.01)
*B64U 20/30* (2023.01)
(Continued)

(52) U.S. Cl.
CPC ............. *B64U 30/30* (2023.01); *B64U 20/30* (2023.01); *B64U 40/20* (2023.01); *B64U 60/60* (2023.01);
(Continued)

(58) Field of Classification Search
CPC ................................ B64C 17/02; B64C 17/04
See application file for complete search history.

(56) References Cited

U.S. PATENT DOCUMENTS

2008/0308685 A1* 12/2008 Decker .................. B64C 39/10 244/53 R
2010/0224723 A1* 9/2010 Apkarian ............... B64U 30/24 244/65

(Continued)

FOREIGN PATENT DOCUMENTS

| | | |
|---|---|---|
| EP | 3450310 | 3/2019 |
| JP | 6790206 | 11/2020 |
| WO | 2021052217 | 3/2021 |

OTHER PUBLICATIONS

International Preliminary Report on Patentability from corresponding PCT Appln. No. PCT/US2021/061242, dated May 30, 2023. 5 pages.

(Continued)

*Primary Examiner* — Joshua D Huson
(74) *Attorney, Agent, or Firm* — Secant IP, PLLC; Edmund P. Pfleger

(57) ABSTRACT

The present disclosure is directed to systems and methods too of implementing a hybrid robotic system capable of reversibly transitioning producing propulsion units may be coupled to the payload platform. In a first position, the payload platform may be positioned such that the thrust-producing propulsion units generate a substantially horizontal thrust to provide horizontal movement of the robotic system. In a second position, the payload platform may be (Continued)

positioned such that the thrust-producing propulsion units generate a substantially vertical thrust to provide vertical movement of the robotic system.

8 Claims, 7 Drawing Sheets

(51) Int. Cl.

| | |
|---|---|
| ***B64U 40/20*** | (2023.01) |
| ***B64U 60/60*** | (2023.01) |
| ***B64U 101/30*** | (2023.01) |
| ***B64U 101/55*** | (2023.01) |

(52) U.S. Cl.

CPC ...... *B64U 2101/30* (2023.01); *B64U 2101/55* (2023.01)

(56) References Cited

U.S. PATENT DOCUMENTS

| | | | | |
|---|---|---|---|---|
| 2014/0055613 | A1 | 2/2014 | Ohtomo et al. | |
| 2016/0264234 | A1* | 9/2016 | Vaughn | B64C 17/02 |
| 2018/0229833 | A1* | 8/2018 | Kimchi | B64U 10/13 |
| 2019/0039721 | A1* | 2/2019 | Liu | B63B 39/02 |
| 2019/0373173 | A1 | 12/2019 | Wang et al. | |
| 2020/0298962 | A1* | 9/2020 | Bailly | B64C 17/04 |
| 2021/0061463 | A1* | 3/2021 | Briod | B64U 30/24 |

OTHER PUBLICATIONS

International Search Report and Written Opinion from PCT/US21/61242 mailed Apr. 12, 2022.

* cited by examiner

HYBRID EXPLORATION AND INSPECTION ROBOT

The present application is a U.S. National Stage Application of PCT Application PCT/US21/61242, filed Nov. 30, 2021, and claims the benefit of U.S. Provisional Application 63/119,422, filed Nov. 30, 2020, the teachings both of which are hereby incorporated by reference in their entirety.

TECHNICAL FIELD

The present disclosure relates to robotic vehicles, more specifically to robotic vehicles capable of traversing rough or irregular surfaces.

BACKGROUND

Robotic drones find widespread use in exploration, investigation, and search and rescue in environments that may be too hazardous, dangerous, costly, or remote for safe human access. Such robotic drones include unmanned terrestrial and aerial vehicles that provide a platform for mapping and sensor arrays such as imaging sensors, thermal sensors, environmental sensors, and similar. Robotic drones, however, do have several drawbacks—one principal drawback is the lack of range and/or deployment time necessitated by the need for the drone to carry an onboard power source, typically secondary storage cells such as batteries or supercapacitors. The need for a robotic drone to continuously draw power from the onboard power source to transit an area limits both the weight and power draw of the sensor array carried by the robotic drone.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
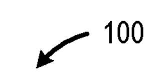
FIG. 1 depicts a simplified elevation view of an illustrative robotic system that includes an external skeleton, a gimbal disposed inside the external skeleton, a first mass disposed at least partially within the gimbal and displaceable along any of three orthogonal axes, a payload member, a sensor suite, at least one propulsion unit, control circuitry, power circuitry, and a flywheel disposed at least partially within the gimbal, in accordance with at least one embodiment described herein.
Figure 1:
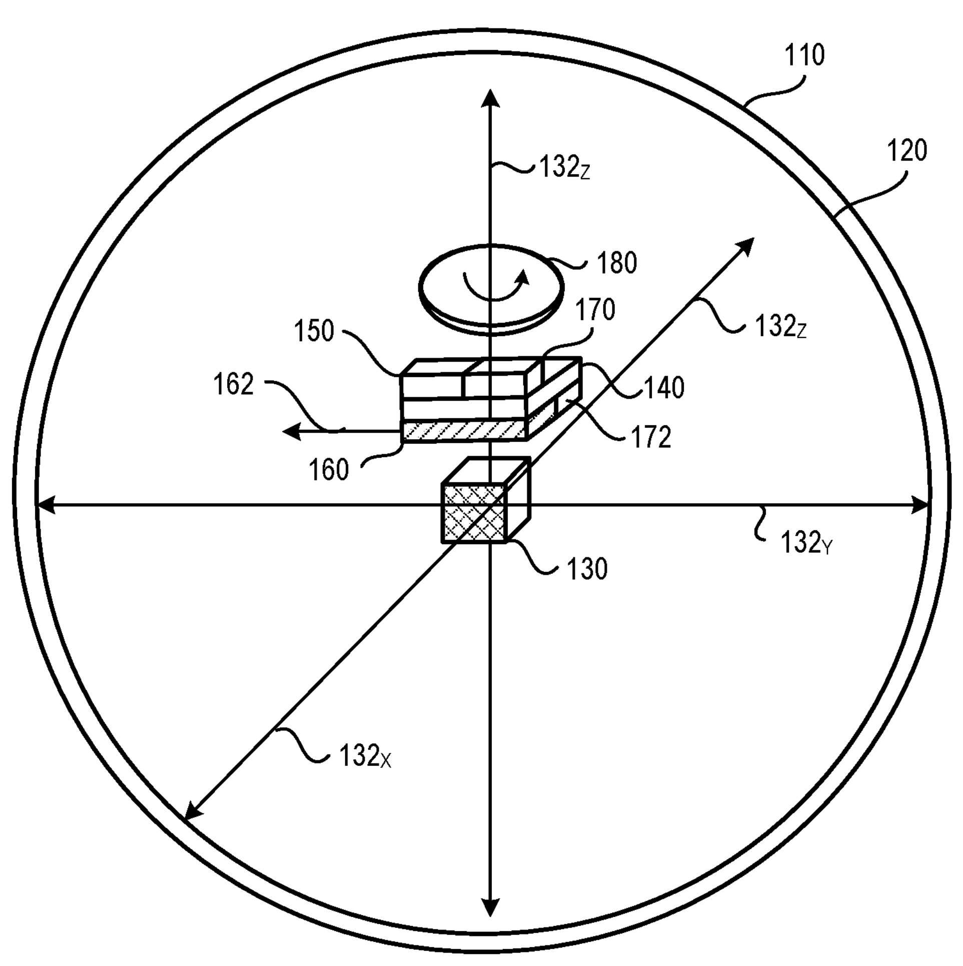

Although the following Detailed Description will proceed with reference being made to illustrative embodiments, many alternatives, modifications and variations thereof will be apparent to those skilled in the art.

DETAILED DESCRIPTION

The systems and methods disclosed herein beneficially provide a robotic system capable of traversing an area using horizontal movement, vertical movement, and combinations of horizontal and vertical movement to maximize duration and range of the robotic system. The systems and methods disclosed herein make use of an external skeleton that surrounds a payload platform that includes one or more thrust producing propulsion units, such as one or more axial flow fans. The payload platform may be selectively and reversibly transitioned from a horizontal travel pose or mode to a vertical travel pose or mode. Using an external skeleton having a circular or oval profile, the robotic systems disclosed herein are able to generate a substantially horizontal thrust capable of causing the external skeleton to "roll"—where the topography of the terrain permits, the external skeleton permits the robotic systems disclosed herein to freely "roll" downhill, expending minimal energy and extending the operational window and range of the robotic system. Where obstructions preclude the use of rolling travel, the payload platform can be reoriented to generate a substantially vertical thrust, thereby allowing the robotic system to pass over the obstructions. Through the selective use of relatively energy-saving horizontal movement and minimizing the use of relatively energy-consuming vertical movement to an "as-needed" basis, the robotic systems and methods disclosed herein beneficially and advantageously improve both the operational window and range of robotic operations. In embodiments, the robotic systems and methods disclosed herein may perform an energy consumption, demand, or requirement analysis for each of multiple potential pathways between a starting point and a destination point. The robotic systems and methods disclosed herein may then select the pathway and/or combination of pathways providing the most efficient energy consumption to cause a movement of the robotic system from the origin point to the selected destination point.

The payload platform may be stabilized using a gimbal disposed within the external skeleton. The gimbal permits the payload platform to return to a defined position (pose) as the robotic system traverses rough, irregular, or broken terrain. The payload platform may be further stabilized by operably coupling an inertial member, such as a flywheel member, to the payload platform. The inertial member or flywheel member provides a counter-force that maintains the pose of the payload member as the robotic system traverses rough, irregular, or broken terrain. In some embodiments, the one or more displaceable masses carried by the robotic system may cause the payload member to transition to a desired pose (e.g., a vertically or horizontally positioned payload member) and may also cause the one or more propulsion units generate thrust sufficient to cause movement of the robotic system based, at least in part the pose of the payload member and the topography of the proposed routing. In some embodiments, the one or more displaceable masses carried by the robotic system may cause the payload member to transition to a desired pose (e.g., a vertically or horizontally positioned payload member) and may also cause the movement of the robotic system based, at least in part the pose of the payload member and the topography of the proposed routing. In some embodiments, the one or more propulsion units generate thrust sufficient to cause the payload member transition to a desired pose (e.g., a vertically or horizontally positioned payload member) and may also cause movement of the robotic system based, at least in part the pose of the payload member and the topography of the proposed routing.

The payload member may support a number of on-board devices and/or systems. For example, the payload member may support control circuitry and power circuitry used to control and power the robotic system. The payload member may additionally support one or more sensor arrays useful in either or both conveying information to one or more system users in a remote sensing environment and/or providing autonomous capabilities (e.g., full self-operation) or semi-autonomous capabilities (e.g., object detection, identification, and/or avoidance) to the robotic system. One or more frame members or similar support members may physically couple the payload platform to the one or more thrust-producing propulsion units. Each of the one or more frame members includes a longitudinal axis extending centrally along the length of the respective frame member. In at least some embodiments, some or all of the one or more propulsion units may continuously, reversibly translate along the longitudinal axis of at least one of the one or more frame members. In at least some embodiments, some or all of the one or more propulsion units may continuously, reversibly, rotate about all or a portion of the circumference or perimeter of at least one of the one or more frame members.

The robotic systems disclosed herein may also include one or more masses that are selectively, reversibly, displaceable within the external skeleton. The one or more displaceable masses may be used to reversibly transition the payload platform and/or the thrust-producing propulsion devices from the horizontal travel pose where the propulsion units generate a substantially horizontal thrust to the vertical travel pose where the propulsion units generate a substantially vertical thrust. For example, the robotic system may include two orthogonal pendulums, each having a selectively displaceable mass to transition between the horizontal travel pose and the vertical travel pose.

A robotic system is provided. The system may include: an external skeleton; a gimbal disposed at least partially within the external skeleton; a payload member disposed in the interior space of the gimbal and operably coupled to the gimbal; at least one propulsion unit physically coupled to the payload member and disposed within the gimbal; and at least one mass disposed within the gimbal, the at least one mass continuously displaceable along at least one of three orthogonal axes.

A multiple-mode robot controller is provided. The controller may include: non-transitory storage circuitry; and control circuitry communicatively coupled to the non-transitory storage circuitry, the control circuitry to: cause a displacement of at least one mass within a gimbal, the gimbal disposed within an external skeleton, the displacement of the at least one mass to selectively, reversibly transition one or more thrust-producing propulsion units disposed within the gimbal between generation of a substantially horizontal thrust and generation of a substantially vertical thrust; and cause a rotation of an inertial member coupled to a payload member coupled to the gimbal.

A non-transitory storage device is provided. The non-transitory storage device may include instructions that, when executed by a multiple-mode robot controller, cause control circuitry within the controller to: cause a displacement of at least one mass within a gimbal, the gimbal disposed within an external skeleton, the displacement of the at least one mass to selectively, reversibly transition one or more thrust-producing propulsion units disposed within the gimbal between generation of a substantially horizontal thrust and generation of a substantially vertical thrust; and cause a rotation of an inertial member coupled to a payload member coupled to the gimbal.

As used herein and in the claims, the term "substantially horizontal" refers to an element, apparatus, or object having an orientation and/or a principal axis that is within 10° with respect to a global x-y plane.

As used herein and in the claims, the term "substantially vertical" refers to an element, apparatus, or object having an orientation and/or a principal axis that is within 10° with respect to a global z-axis.

FIG. 1 depicts a simplified elevation view of an illustrative robotic system 100 that includes an external skeleton 110, a gimbal 120 disposed inside the external skeleton 110, a first mass 130 disposed at least partially within the gimbal 120 and displaceable along any of three orthogonal axes 132$x$, 132$y$, and 132$z$, a payload member 140, a sensor suite 150, at least one propulsion unit 160, control circuitry 170, power circuitry 172, and a flywheel 180 disposed at least partially within the gimbal 120, in accordance with at least one embodiment described herein. In operation, the first mass 130 may be selectively, reversibly, displaced within the gimbal 120 to change or alter the pose of the robotic system 100. For example, when the first mass 130 is disposed in a first position distal from the payload platform 140 in the x-y plane, the pose of the payload system changes to the substantially horizontal travel mode and thrust 162 produced by the at least one propulsion unit 160 may cause a displacement of the robotic system 100 in a substantially horizontal travel direction. In contrast, when the first mass 130 is disposed in a second position distal from the payload platform 140 along the −z axis, the pose of the payload system changes to the substantially vertical travel mode and thrust 162 produced by the at least one propulsion unit 160 may cause a displacement of the robotic system in a substantially vertical travel direction. Positioning the first mass 130 at one or more intermediate positions, the thrust 162 produced by the at least one propulsion unit 160 may cause a displacement of the robotic system 100 in a direction that combines movement along both horizontal and vertical directions (e.g., a "diagonal" movement that includes both horizontal and vertical motion). Beneficially and advantageously, when terrain permits the robotic system to "roll" across a downward sloping surface (i.e. move across a surface), such movement may be accomplished using gravitational forces in conjunction with or in place of thrust produced by the at least one propulsion unit 160, thereby reducing the control effort of the one or more propulsion units while rolling thereby conserving onboard power that otherwise would have been consumed by the one or more propulsion units. Control circuitry 170 positions the first mass 130 within the gimbal 120 and controls the thrust 162 of the one or more propulsion units 160 to cause the movement of the robotic system 100 in a desired direction. In embodiments, rather than using force/torque to dampen movement or oscillations within the robotic system, the center of mass of the system may be shifted within the center of the external skeleton 110 to dampen the movement or oscillation of the robotic system 100.

In at least some embodiments, the control circuitry 170 may autonomously control the movement of the robotic system 100 using information and/or data provided by the sensor array 150 as an input to a control algorithm. In at least some embodiments, such control and/or route planning and/or determination algorithms may be implemented by the control circuitry 170 using one or more of: machine vision, object detection, object identification, object avoidance, etc.

In embodiments, the external skeleton 110 may include a generally spherical framework, but is not limited to a spherical structure. Any external skeleton geometry that permits the movement of the robotic system 100 through "rolling" or similar non—or minimal energy consuming movement may be substituted. For example, the external skeleton 110 may, in some implementations, include a cylindrical physical geometry, an ovoid physical geometry, a barbell physical geometry, or any similar round physical geometry having a rounded profile and/or perimeter. In embodiments, the external skeleton 110 may include a plurality of members coupled using a plurality of connectors to form a rigid external skeleton 110. In other embodiments, the external skeleton 110 may include a plurality of members coupled using a plurality of flexible connectors to form an external skeleton 110 collapsible under application of a compressive force that "springs" or is otherwise biased into a final physical configuration upon removal of the compressive force. The external skeleton 110 may have any dimensions. For example, where the external skeleton 110 forms a spherical structure, the external skeleton 110 may have a diameter of about: 6 inches (in) or less; 8 in. or less; 10 in. or less; 12 in. or less; 18 in. or less; 24 in. or less; 36 in. or less; 48 in. or less; 60 in. or less; or 72 in. or less. In embodiments, the members forming the external skeleton 110 may be fabricated using any material or combination of materials. For example, the members forming the external skeleton 110 may be fabricated using one or more non-metallic materials, such as carbon fiber. In another example, the members forming the external skeleton 110 may be fabricated using one or more metallic materials, such as aluminum, an aluminum alloy, titanium, or a titanium alloy. The connectors that physically couple, connect, or link the members forming the external skeleton 110 may be fabricated using one or more rigid materials, one or more flexible materials, or any combination thereof.

The gimbal 120 is disposed within the external skeleton 110. In some embodiments, the gimbal 120 may include a three-axis gimbal in which all three of the gimbal rings can rotate to provide three degrees of freedom (roll, pitch, yaw). The gimbal system allows the outer frame to rotate passively around the inner frame about two or more rotational axes. In at least some embodiments, a fourth gimbal ring may be added to the gimbal 120 to eliminate gimbal lock in the robotic system 100. In such embodiments, the fourth gimbal ring may include a driven gimbal ring that is maintained 90° out of alignment with the flywheel shaft. In other embodiments, the gimbal 120 may include a three-axis gimbal in which one or more of the structures or rings included in the gimbal 120 may be rigidly affixed, thereby limiting the gimbal to providing two or fewer degrees of freedom. In embodiments, the gimbal 120 may maintain the orientation of a payload member 140 with respect to the external skeleton 110. In embodiments, one or more of: the sensor suite 150; the at least one propulsion unit 160; the control circuitry 170; and/or the flywheel member 180 may be operably coupled to the payload member 140.

In embodiments, the first mass 130 may include one or more masses capable of a selective, reversible, displacement along any one of three orthogonal axes **132*x*, 132*y*, and 132*z*. In other embodiments, the first mass 130 may include one or more masses capable of a selective, reversible, displacement to any point within the gimbal 120. In embodiments, the first mass 130 may include a mass selectively, reversibly, displaceable along a track, rail, or similar guide member. In embodiments, one or more actuators, such as one or more linear actuators, may cause the selective, reversible, displacement of the first mass 130 may along a track, rail, or similar guide member. In embodiments, the mass of the first mass 130 may be based, at least in part, on one or more physical dimensions of the external skeleton 110. For example, for a spherical external skeleton, generally the greater the diameter of the external skeleton 110, the larger the mass of the first mass 130. The first mass 130 may have any mass. For example, the first mass 130** may have a mass of about: 10 grams (g) or less; 20 g or less; 50 g or less; 100 g or less; 250 g or less; 500 g or less; or 1,000 g or less.

The payload member 140 may include the sensor array 150 and the control circuitry 170. In some embodiments, the one or more propulsion units 160 may be directly or indirectly (e.g., through pylons or similar mounting interface members) physically coupled to the payload member 140. In some embodiments, the payload member 140 may be operably coupled to the gimbal 120. In embodiments, the payload member 140 may include surface features and/or connectors to facilitate the operable coupling of one or more of: the sensor array 150, the control circuitry 170, the power circuitry 172, and/or the flywheel member 180 to the payload member 140. In embodiments, the payload member 140 may include an enclosure or similar housing that may be disposed about all or a portion of the sensor array 150, the control circuitry 170, the power circuitry 172, and/or the flywheel member 180 to protect the components from hostile, explosive, flammable, or wet environments.

The sensor array 150 may include any number and/or combination of sensors capable of providing information and/or data collected or otherwise acquired from the environment surrounding the robotic system 100. In embodiments, the sensor array 150 may include one or more of: one or more visible light (i.e., wavelengths from 390 nanometers (nm) to 760 nm) image acquisition sensors; one or more infrared image acquisition sensors; one or more accelerometers; one or more thermal imaging sensors; one or more altimeters; one or more thermal sensors; one or more humidity sensors; one or more ambient pressure sensors; one or more audio input (e.g., microphone) sensors; one or more chemical, biological, nuclear, or gas specific sensors; one or more LIDAR sensors; one or more sonar sensors; one or more proximity sensors; one or more radar sensors; or combinations thereof.

The one or more propulsion units 160 may include any number and/or combination of currently available and/or future developed devices capable of producing thrust 162 sufficient to cause the movement, change of pose and/or position of the payload platform within the robotic system 100. In at least some embodiments, the one or more propulsion units 160 may include a plurality of devices capable of producing thrust 162 sufficient to cause the movement of the robotic system 100. In embodiments, the one or more propulsion units 160 may include one or more axial-flow fans. In embodiments, the one or more propulsion units 160 may be operably coupled to a gimbal mount or similarly positionable structure to provide a more stable directional thrust capability.

The control circuitry 170 may include any number and/or combination of electrical components, semiconductor devices, optical devices, and/or logic elements capable of positioning the first mass 130 and causing the selective operation and/or positioning and/or orientation of the first mass 130 and/or the one or more propulsion units 160. In embodiments, the control circuitry 170 may include one or more transmitters, one or more receivers, and/or one or more transceivers. In such embodiments, the one or more transceivers may permit the communicative coupling of the robotic system 100 with a remote control device operated by a system user. In some embodiments, the control circuitry 170 may receive at least some of the signals generated by the sensor array 150 and may use such signals to provide autonomous or semi-autonomous operational capability. For example, the control circuitry 170 may receive one or more signals generated by the sensor array 150 and may use the information and/or data included in the one or more signals to provide object detection, object mapping, object identification, and/or object avoidance capabilities. In embodiments, the control circuitry 170 may include one or more non-transitory storage devices to store or otherwise retain at least a portion of the information and/or data generated by the sensor array 150. In at least some embodiments, the control circuitry 170 may communicate all or a portion of the information and/or data generated by the sensor array 150 to one or more remote locations, for example to one or more cloud-based servers.

The power circuitry 172, may include one or more energy storage devices such as one or more secondary batteries, supercapacitors, ultracapacitors, fuel cells or combinations thereof. In embodiments, the power circuitry 172 may include one or more energy collection or scavenging devices. Example energy collection or scavenging devices include but are not limited to: one or more solar energy collection devices or systems, one or more wind energy collection devices or systems, one or more thermal energy collection devices or systems, and/or one or more kinetic energy collection devices or systems, The power circuitry 172 may include power management circuitry to control the delivery of power from one or more energy storage devices to the flywheel member 180, the control circuitry 170, the one or more propulsion units 160, and/or the actuators used to position the first mass 130 within the gimbal 120.

The flywheel member 180 may be operably coupled to the payload member 140 to inertially stabilize the payload member 140 as the robotic system 100 travels across a surface. The flywheel member may include any number or combination of rotating masses. In at least some embodiments, the flywheel member 180 may be disposed along at least one of a horizontal axis of the payload member 140 and/or a vertical axis of the payload member 140. The flywheel member 180 may have any physical configuration. In some embodiments, the flywheel member 180 may include a weighted balanced disc-shaped member. The mass of the flywheel member 180 may be based on the physical size, shape, and/or geometry of the external skeleton 110. In some embodiments, the mass of the flywheel member 180 may be based on the diameter of a spherical external skeleton 110. The flywheel 180 may include a controllable motor to enable controllable rotation of the rotating masses, and including controllable velocity increase/decrease/stopping of the flywheel.

Figure 2A:
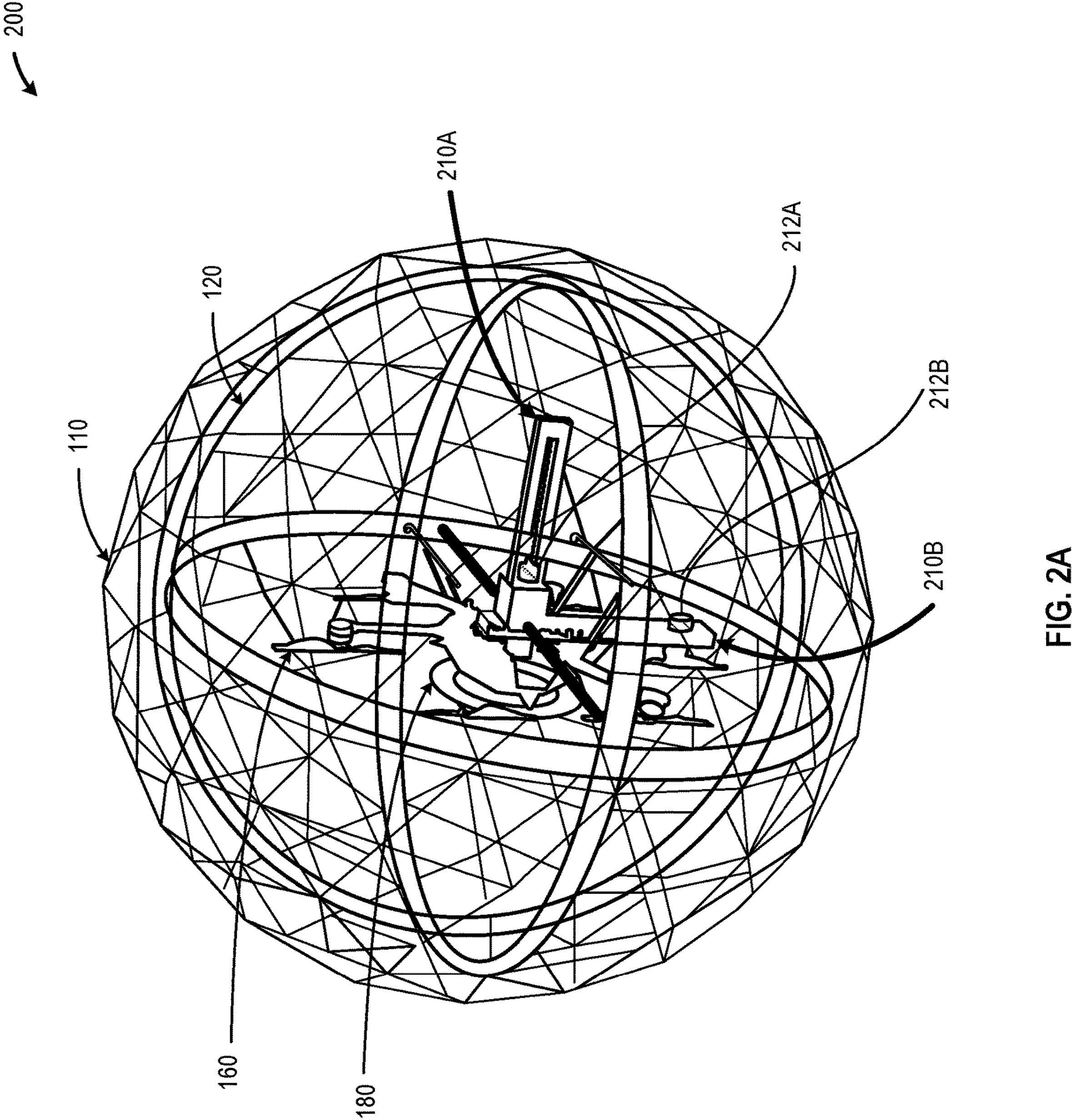
FIG. 2A is a perspective view of an illustrative robotic system that includes a two orthogonal pendulums, each including an independently controllable, reversible, displaceable masses, respectively, to selectively alter the pose of the robotic system from a substantially horizontal travel pose to a substantially vertical travel pose, in accordance with at least one embodiment described herein.
Figure 2B:
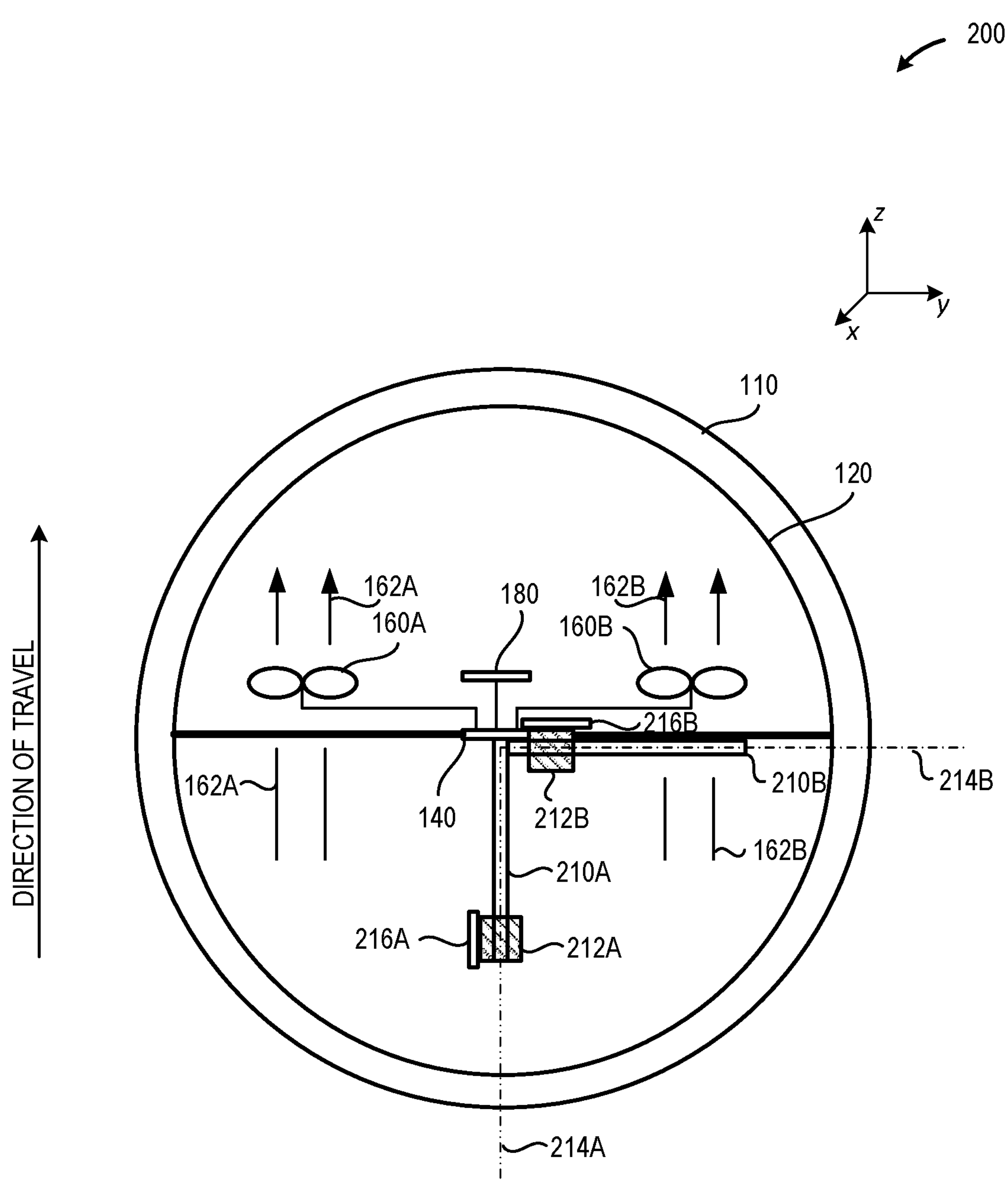
FIG. 2B is a simplified cross-sectional view of the illustrative robotic system depicted in FIG. 2A in which the displaceable masses have been positioned on their respective pendulums to place the robotic system in a substantially vertical travel pose, in accordance with at least one embodiment described herein.
Figure 2C:
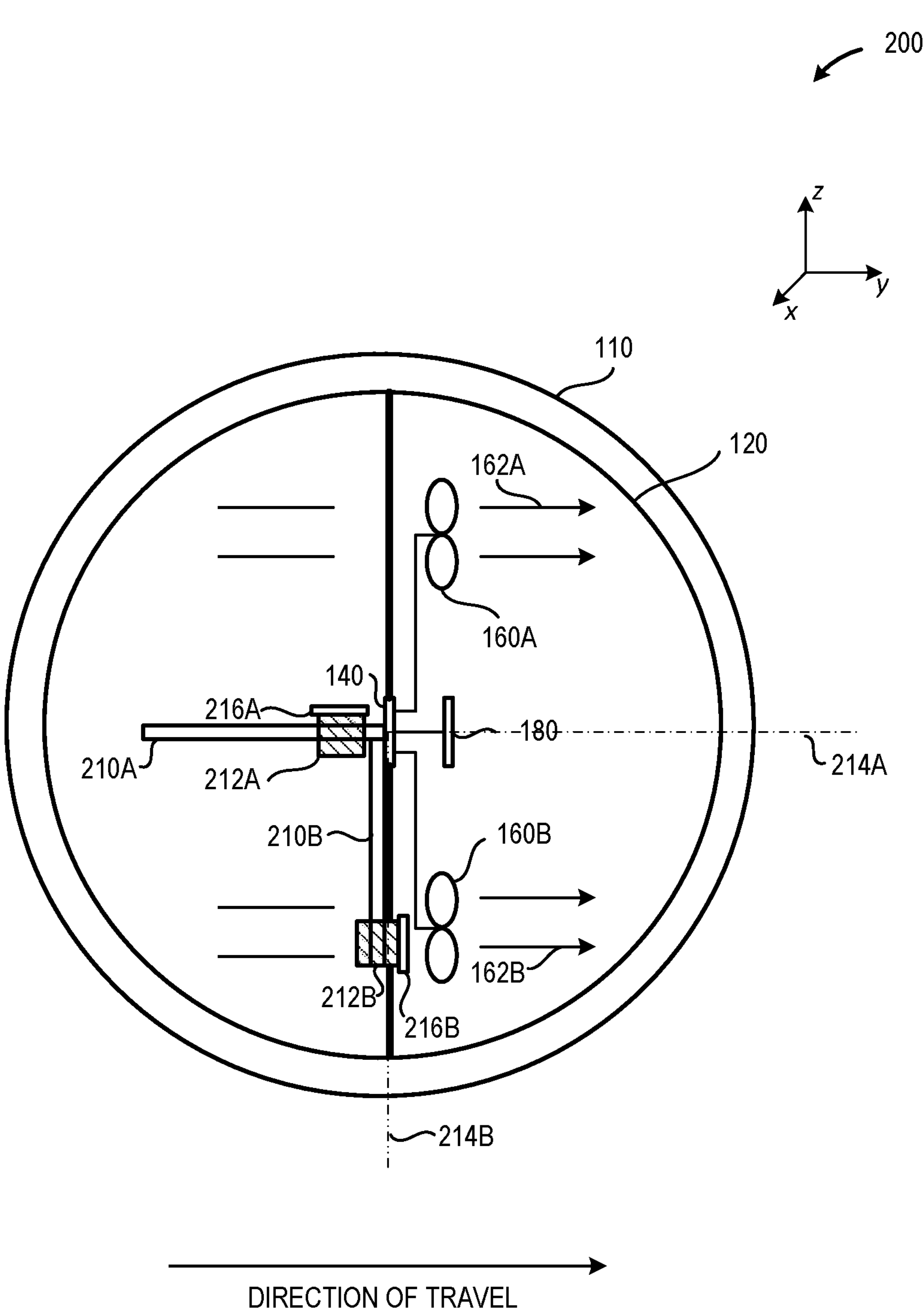
FIG. 2C is a simplified cross-sectional view of the illustrative robotic system depicted in FIG. 2A in which the displaceable masses have been positioned on their respected pendulums to place the robotic system in a substantially horizontal travel pose, in accordance with at least one embodiment described herein.

FIG. 2A is a perspective view of an illustrative robotic system 200 that includes a two orthogonal pendulums 210A and 210B (collectively, "pendulums 210"), each including an independently controllable, reversible, displaceable masses 212A and 212B (collectively, "displaceable masses 212"), respectively, to selectively alter the pose of the robotic system 200 from a substantially horizontal travel pose to a substantially vertical travel pose, in accordance with at least one embodiment described herein. As depicted in FIG. 2A, the robotic system 200 uses the flywheel member 180 in conjunction with the displaceable masses 212 to beneficially provide passive control of the pose of the payload member 140 using minimal energy compared to an active control of payload member 140 using the one or more propulsion units 160. FIG. 2B is a simplified cross-sectional view of the illustrative robotic system 200 depicted in FIG. 2A in which the displaceable masses 212A and 212B have been positioned on their respective pendulums 210A and 210B to cause the robotic system 200 to travel in a substantially vertical direction, in accordance with at least one embodiment described herein. FIG. 2C is a simplified cross-sectional view of the illustrative robotic system 200 depicted in FIG. 2A in which the displaceable masses 212A and 212B have been positioned on their respected pendulums 210A and 210B to cause the robotic system 200 to travel in a substantially horizontal direction, in accordance with at least one embodiment described herein.

Referring to FIGS. 2A, 2B, and 2C together, a first pendulum 210A having a first displaceable mass 212A and a first longitudinal axis 214A extends substantially perpendicular to the payload member 140 and a second pendulum 210B having a second displaceable mass 212B and a second longitudinal axis 214B extends substantially parallel to the payload member 140. The displaceable masses 212A and 212B may each be continuously displaced at any location along their respective pendulums 210A and 210B, respectively, using any number and/or combination of actuators, such as one or more linear actuators. In embodiments, the control circuitry 170 may independently position the displaceable masses 212A and 212B at any location along the longitudinal axes 214A and 214B of their respective pendulums 210A and 210B responsive to instructions provided by a user or operator of the robotic system 200. In other embodiments, the control circuitry 170 may autonomously position the displaceable masses 212A and 212B at any location along the longitudinal axes 214A and 214B of their respective pendulums 210A and 210B responsive, at least in part, to one or more signals received from the sensor array 150.

Note that although two pendulums 210A and 210B are depicted in FIGS. 2A, 2B, and 2C, in some embodiments the depicted two pendulum system may be replaced using a single pendulum system. A single pendulum system may include a hinged or similarly pivotable pendulum that may be pivoted from a first position substantially perpendicular to the payload member 140 (i.e., a first position with the single pendulum having a longitudinal axis 214A as depicted in FIGS. 2B and 2C) to a second position substantially parallel to the payload member 140 (i.e., a second position with the single pendulum having a longitudinal axis 214B depicted in FIGS. 2B and 2C). In such single pendulum embodiments, the mass may be coupled or otherwise affixed proximate the distal end (i.e., the end farthest from the payload member 140) of the single pendulum.

Referring next to FIG. 2B, to achieve the vertical travel pose, the displaceable mass 212A can be disposed proximate the distal end of the first pendulum 210A (i.e., the end of the first pendulum 210A farthest from the payload member 140) and the displaceable mass 212B may be disposed at the end of the second pendulum 210B proximate the payload member 140 (i.e., of the second pendulum 210B nearest the payload member 140). Such an arrangement of displaceable masses 212 places the payload member 140 in a position that is substantially parallel to the global x-y plane and the thrust 162A, 162B produced by the propulsion units 160A and 160B substantially perpendicular to the global x-y plane beneath the robotic system 200, thereby facilitating vertical travel of the robotic system. Of course, in this example it is assumed that the payloads is near the geometric center of the robot. It should be understood that in other embodiments the payload may be anywhere within the robot, and thus, the displacement of the masses may be based on where the center of gravity exists. The vertical travel mode depicted in FIG. 2B beneficially permits the robotic system 200 to travel above terrain when the terrain includes obstacles, debris, or other objects or other conditions that make rolling difficult or impossible or energy inefficient. It should be noted that in "flying mode", the orientation may controlled so that the robot includes translational movement (x, y movement) in addition to z movement. Note that since vertical travel generally consumes the greatest quantity of power, by limiting the need for vertical travel to only those instances requiring vertical travel, power consumption is reduced and range may be increased.

Next referring to FIG. 2C, to achieve the horizontal travel pose, the displaceable mass 212A is disposed at the end of the first pendulum 210A proximate the payload member 140 and the displaceable mass 212B is disposed at the distal end of the second pendulum 210B. Such an arrangement of displaceable masses 212A and 212B places the payload member 140 in a position that is substantially perpendicular to an x-y reference plane beneath the robotic system 200 and the thrust 162A, 162B produced by the propulsion units 160A and 160B substantially parallel to x-y reference plane beneath the robotic system 200, thereby facilitating horizontal travel of the robotic system 200. The horizontal travel mode depicted in FIG. 2C beneficially permits the robotic system 200 to travel across the surface beneath the robotic system (e.g., by "rolling"). Where the surface beneath the robotic system is downward sloped, such horizontal travel of the robotic system may be accomplished with minimal or even no use of power, thereby reducing power consumption an increasing the range of the robotic system 200.

Referring again to FIGS. 2B and 2C, in another embodiment, and to reduce the cost, weight, and/or complexity associated with using a combination of actuators (such as linear actuators) for displacing masses 212A and 212B along 214A and 214B axes, locking mechanisms 216A and 216B may be associated with each respective mass 212A, 212B and each respective pendulum 210A, 210B. The locking mechanisms 216A and 216B may be used to controllably displace masses 212A and 212B. When the robot is to go from one position (e.g., thrust position) to another position (e.g., rolling position), the locking mechanisms 216A and 216B may disengage to enable the masses to move freely along the pendulums. The locking mechanisms 216A and 216B may be powered the power circuitry 172. To provide movement of the masses, thrust control is applied so as to rotate the robot, allowing the masses to slide under gravitational forces to the opposite end of the pendulums. Once the masses are in place, the locking mechanisms 216A and 216B are controlled to lock the masses in the new position. By way of example, the transition from thrust position shown in FIG. 2B to the rolling position shown in FIG. 2C may include the following process steps. At the start of the process, the locking mechanisms 216A and 216B are disengaged for both masses. Then, the control circuitry commands the propellers to generate a clockwise rotation along the axis normal to 214A and 214B (214A cross 214B). This movement allows mass 212B to move to the right along 214B axis. To move the mass 212A to the right using gravity, the system is rotated sufficient for the mass to overcome frictional forces to enable gravity to move the mass, e.g., clockwise with respect to orientation shown FIG. 2B. The amount of rotation may be based on, for example, the mass value of the masses, the frictional forces between the mass and the pendulum, etc. In that regard, in some embodiments, friction reducing structures/materials (e.g., bearings, lubricated seals, etc., not shown) may be included at an interface between a mass and a pendulum to enable the mass to move more freely along the pendulum.

The sensor array 150 communicates to the control circuitry 170 to ensure that a rotation is provided by propulsion unit 160. Once the masses have been moved to a desired location along each pendulum, the locking mechanisms 216A and 216B are engaged and the robot is oriented into the rolling position of FIG. 2C. Of course, this process can be reversed (with counterclockwise rotation) to move the masses from the position shown in FIG. 2C (rolling position) to the position shown in FIG. 2B (thrust position).

In one embodiment, the locking mechanisms 216A and 216B include an electronically controlled grasping mechanism mounted on one or both sides to lock each respective mass to the corresponding pendulum. In this embodiment, and interior surface of each mass may include an actuator that can push out a movable piece that connects the masses to the corresponding pendulums using pressure. The disengagement can occur by deactuating. In other embodiments, the movable piece can be actuated with a spring-loaded actuator.

In another embodiment, masses 212A, 212B and pendulums 210A, 210B may be formed of controllably inflatable/deflectable material that can be pressurized to lock the mass 212A to pendulum 210A and lock the mass 212B to pendulum 210B. To disengage the locking mechanism the pressure can be removed to deflate the locked parts and disengage the masses from the pendulums. In still another embodiment, masses 212A, 212B may form electromagnets which can be controllably activated and deactivated. For example, pendulums 210A and 210B may be formed of a metallic material that could attract them to the masses when magnetized. The electromagnets can be activated and deactivated to lock the masses to the pendulums. In still another embodiment, controllably actuated pins may be mounted on 210A and 210B to hold the masses in place.

The locking mechanisms 216A and 216B may include sensory circuitry to measure the displacement of the masses along their corresponding axes. For multirotor systems with 4 propellers or more, the control unit can generate rotation along any axis to orient the robot in any specific direction.

Figure 3A:
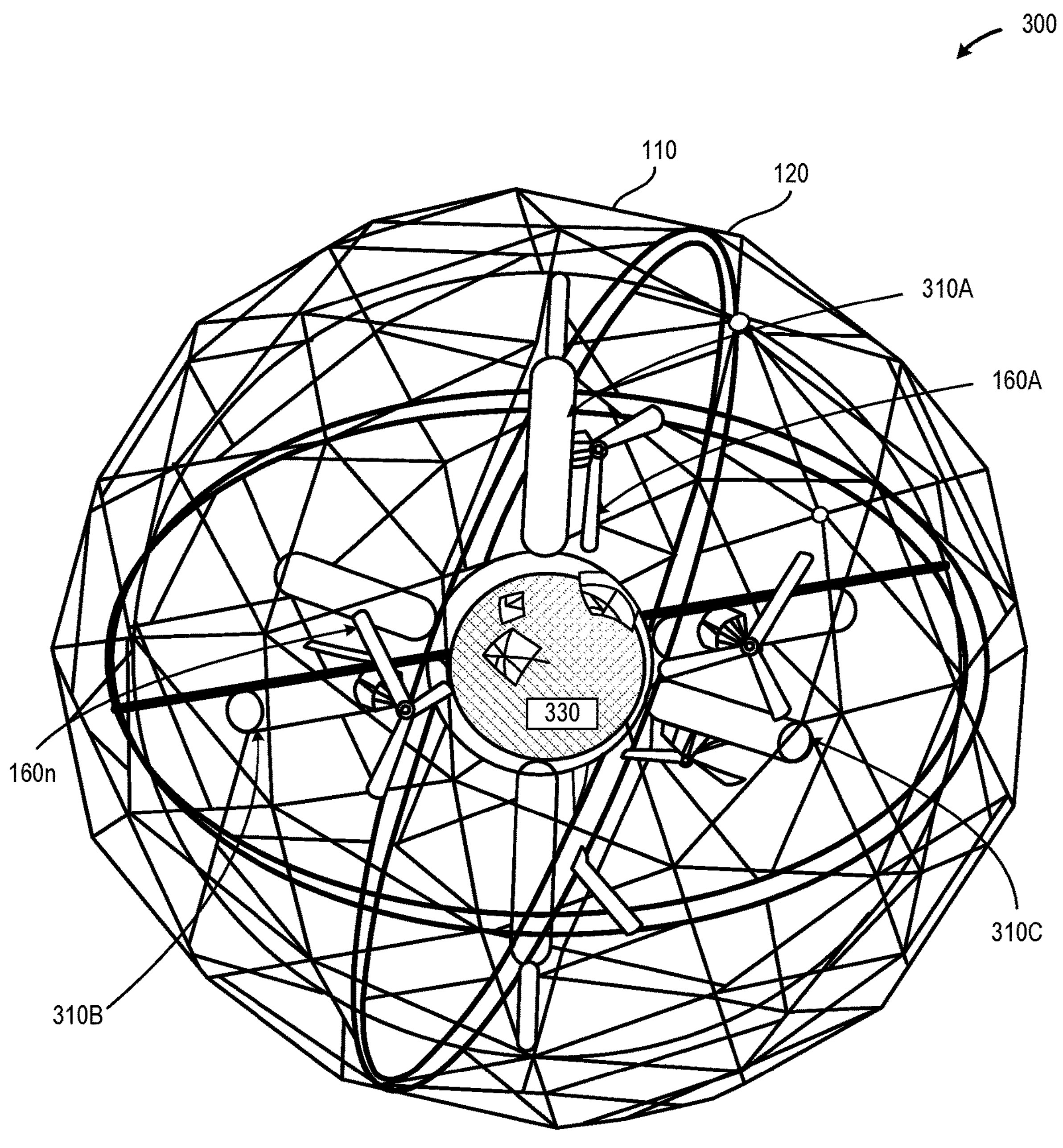
FIG. 3A is a perspective view of an illustrative robotic system that includes three orthogonal members and a displaceable mass selectively displaceable along at least a portion of the length of each of the three orthogonal members to selectively alter the pose of the robotic system from a substantially horizontal travel pose to a substantially vertical travel pose, in accordance with at least one embodiment described herein.
Figure 3B:
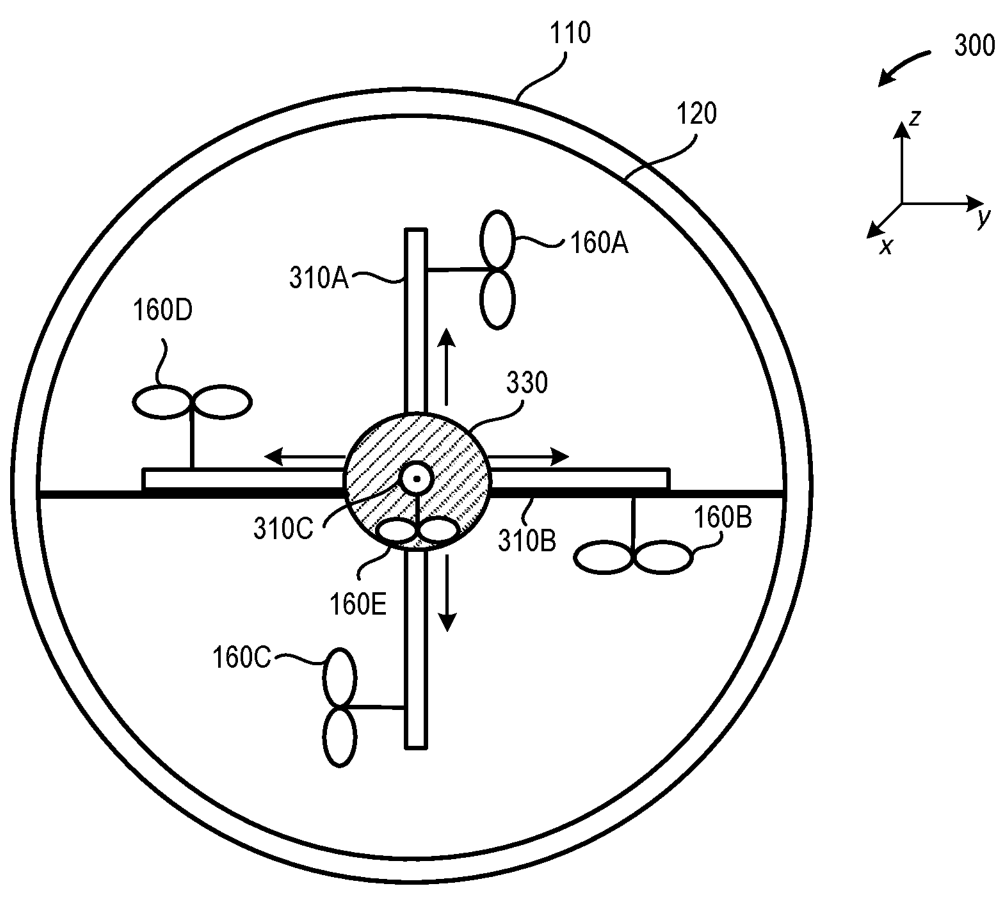
FIG. 3B is a simplified cross-sectional view of the illustrative robotic system in FIG. 3A depicting the physical relationship between the three orthogonal members, the displaceable mass and the propulsion units, in accordance with at least one embodiment described herein.
Figure 3C:
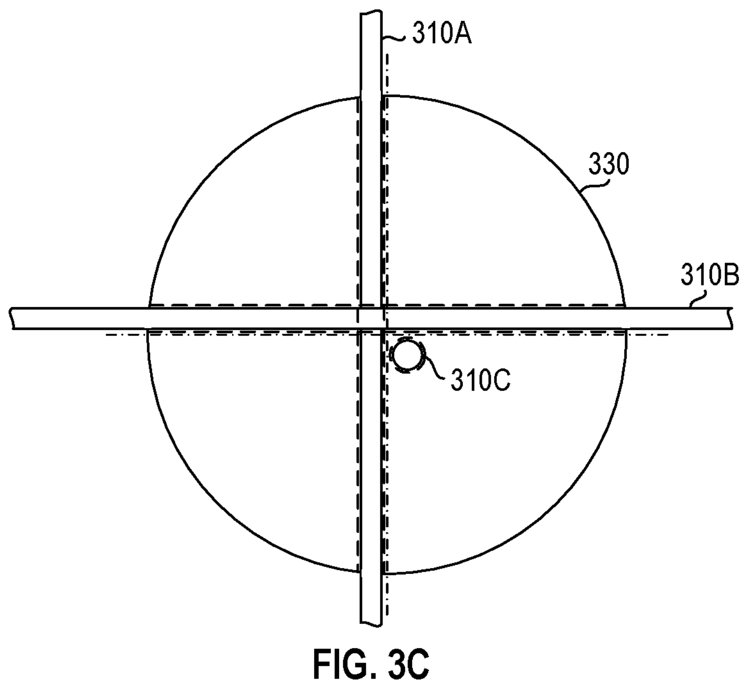
FIG. 3C is a side elevation view of an illustrative displaceable mass and three channels through which the three orthogonal members pass, in accordance with at least one embodiment described herein.

FIG. 3A is a perspective view of an illustrative robotic system 300 that includes three orthogonal members 310A, 310B, and 310C and a displaceable mass 330 selectively displaceable along at least a portion of the length of each of the three orthogonal members 310A, 310B, and 310C to selectively alter the pose of the robotic system 300 from a substantially horizontal travel pose to a substantially vertical travel pose, in accordance with at least one embodiment described herein. FIG. 3B is a simplified cross-sectional view of the illustrative robotic system 300 in FIG. 3A depicting the physical relationship between the three orthogonal members 310A, 310B, and 310C, the displaceable mass 330 and the propulsion units 160A-160E, in accordance with at least one embodiment described herein. FIG. 3C is a side elevation view of an illustrative displaceable mass 330 and three channels through which the three orthogonal members 310A, 310B, and 310C pass, in accordance with at least one embodiment described herein. As depicted in FIG. 3A, in some embodiments, the displaceable mass 310 may include some or all of: the first mass 130, the payload member 140, the sensor array 150, the control circuitry 170, and/or the flywheel member 180 and/or any other component described herein.

Referring to FIGS. 3A, 3B, and 3C the displaceable mass 330 may be selectively displaced and/or oscillated along at least a portion of the length of any one of the three orthogonal members 310A, 310B, and 310C. The displaceable mass 330 may be controllably displaced along any one of the three orthogonal members 310A, 310B, and 310C, using any number and/or combination of actuators, such as one or more linear actuators, locking mechanisms, one or more propulsion unit (s), etc., as described above. In embodiments, the control circuitry 170 may selectively displace and/or oscillate the displaceable mass 330 along one or more of the three orthogonal members 310A, 310B, and 310C responsive to instructions provided by a user or operator of the robotic system 300. In other embodiments, the control circuitry 170 may autonomously displace and/or oscillate the displaceable mass 330 along one or more of the three orthogonal members 310A, 310B, and 310C responsive, at least in part, to one or more signals received from the sensor array 150. The displacement of the displaceable mass 330 may shift the center of gravity of the robotic system 300, thereby causing the change of the pose of the payload. It could also cause the robotic system to “roll.” Selective displacement of the displaceable mass 330 may therefore be useful in controlling both the direction and speed of the horizontal movement or “roll” of the robotic system 300.

Referring next to FIGS. 3B and 3C, to achieve the substantially vertical travel mode, the displaceable mass 330 may be selectively positioned along any one of the three orthogonal members 310A, 310B, and 310C and some or all of the propulsion units 160A-160E may be positioned to provide an upward thrust 162A-162E, causing a vertical displacement of the robotic system 300. In at least some embodiments, some or all of the propulsion units 160A-160E may be operably coupled to a gimbal or similar two- or three-axis selectively positionable device to facilitate vertical movement or a combined vertical and horizontal movement of the robotic system 300. The ability to quickly and easily change from a horizontal travel pose to the vertical travel pose beneficially permits the robotic system 300 to travel in an energy saving mode across the surface of terrain in the absence of obstructions and quickly convert to a vertical travel pose to traverse obstructions or any other similar obstacle, debris, or other objects that make horizontal travel (e.g., by “rolling”) difficult or impossible. Note that since substantially vertical travel generally consumes the greatest quantity of power, by limiting the need for vertical travel to only those instances requiring vertical travel, power consumption may be reduced and range may be increased. Additionally, on some occasions substantially horizontal travel may require a greater quantity of power than substantially vertical travel, the ability to selectively and reversibly switch between horizontal travel and vertical travel may reduce the power consumed to traverse a given topography.

Figure 4:
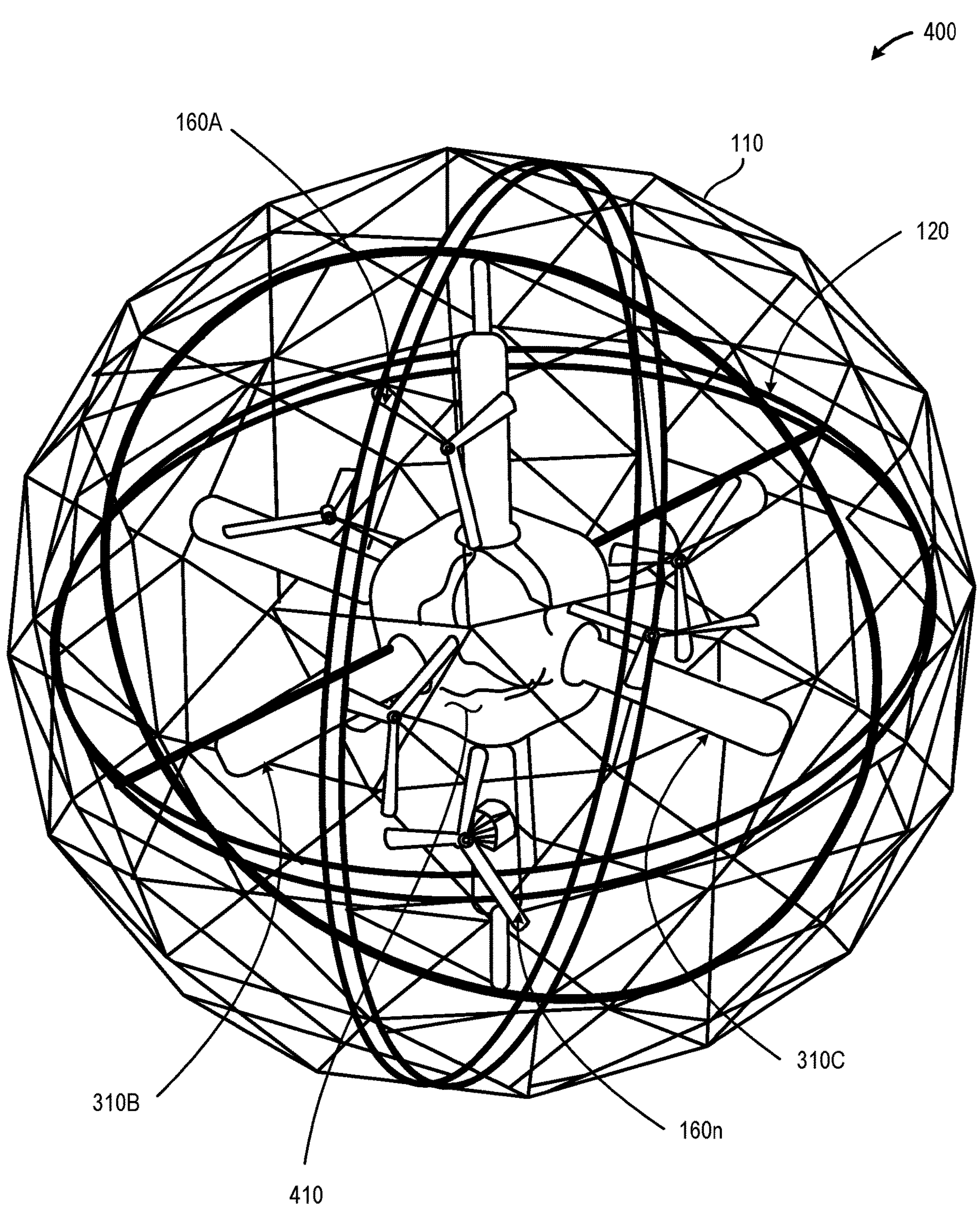
FIG. 4 is a perspective view of an illustrative robotic system 400 that includes three orthogonal members and a sealed mass displaceable along at least a portion of each of the three orthogonal members to selectively alter the pose of the robotic system from a substantially horizontal travel pose to a substantially vertical travel pose, in accordance with at least one embodiment described herein.

FIG. 4 is a perspective view of an illustrative robotic system 400 that includes three orthogonal members 310A, 310B, and 310C and a sealed mass 410 displaceable along at least a portion of each of the three orthogonal members 310A, 310B, and 310C to selectively alter the pose of the robotic system 400 from a substantially horizontal travel pose to a substantially vertical travel pose, in accordance with at least one embodiment described herein. As depicted in FIG. 4, the sealed mass 410 may include one or more of: the first mass 130, the payload member 140, the sensor array 150, control circuitry 170, and/or the flywheel member 180 inside a sealed environment making possible the use of the robotic system in hostile or underwater environments. Although axial-flow fans are depicted as propulsion units 160A-160*n* in FIG. 4, in a liquid or fluid environment, a propeller, hydrojet, or similar device may be substituted to provide thrust using a liquid rather than a gas.

It should be noted that in any of the embodiments described herein, the masses may be controllably displaced along an appropriate axis so that the center of gravity of the robot system is substantially coincident with the geometric center of the external skeleton. Such an embodiment may be useful, for example, for stationary observation so that gravitational forces do not disturb an orientation of the device. For example, the robot system may be employed to have the sensors (e.g. cameras, depth sensor, payload) to look at specific direction without or with minimal usage of the propellers to maintain a specific direction (e.g., a case that the sensors need to target a specific direction that requires a configuration that is neither achieved by rolling position nor thrusting position). In such case the propellers have to provide more force to stop the system from switching to rolling position or thrusting position due to gravity. By controllably displacing each respective mass along an appropriate axis so that the center of gravity of the robot is substantially coincident with the geometric center of the skeleton, the thrust needed to maintain a stationary and/or moving position may be substantially reduced or eliminated, thus saving significant system resources. In some embodiments, an additional pendulum/mass combination may be included to provided greater accuracy of center of gravity location.

It should be noted that both the flywheel and masses may be used independently or in combination to stabilize an orientation, depending on how much energy and how much stabilization is needed for a given environment is needed for a given mission/application (e.g., needing a very steady motion and/or resting state for a given application). For example, turning the flywheel on while the robot is rolling may provide enhanced stabilization in a specific direction (by maintaining thrust in an x-y direction). As another example, turning the flywheel on while flying may enhance stabilization in z axis. Stabilize as used herein means maintaining a specific orientation within engineering tolerances and/or mission parameter tolerances. Thus, using the pendulum/mass and flywheel in combination may improve energy efficiency and reduce in thruster usage.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Thus, the present disclosure is directed to systems and methods of implementing a hybrid robotic system capable of reversibly transitioning between a horizontal travel pose and a vertical travel pose to traverse irregular, broken, or obstructed terrain in an energy efficient manner. The robotic systems and methods disclosed herein include an external skeleton surrounding a gimbal and flywheel stabilized payload platform capable of reversibly transitioning between a horizontal travel mode and vertical travel mode via the selective displacement of one or more masses within the gimbal. One or more thrust-producing propulsion units may be coupled to the payload platform. In a first position, the payload platform may be positioned such that the thrust-producing propulsion units generate a substantially horizontal thrust to provide horizontal movement of the robotic system. In a second position, the payload platform may be positioned such that the thrust-producing propulsion units generate a substantially vertical thrust to provide vertical movement of the robotic system.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for providing robotic systems having the capability to reversibly, selectively transition between a horizontal travel mode and a vertical travel mode.

According to example 1, there is provided a robotic system. The system may include: an external skeleton; a gimbal disposed at least partially within the external skeleton; a payload member disposed in the interior space of the gimbal and operably coupled to the gimbal; at least one propulsion unit physically coupled to the payload member and disposed within the gimbal; and at least one mass disposed within the gimbal, the at least one mass continuously displaceable along at least one of three orthogonal axes.

Example 2 may include elements of example 1 where the external skeleton comprises a spherical external skeleton.

Example 3 may include elements of any of examples 1 or 2 where the gimbal comprises a three-axis gimbal disposed at least partially within the spherical external skeleton.

Example 4 may include elements of any of examples 1 through 3 and the system may further include: a flywheel operably coupled to the payload member.

Example 5 may include elements of any of examples 1 through 4 and the system may further include: controller circuitry to cause the displacement of the at least one mass. Example 6 may include elements of any of examples 1 through 5 where the at least one propulsion unit comprises at least one axial flow fan having an axis of rotation, the at least one axial flow fan operably coupled to the payload member.

Example 7 may include elements of any of examples 1 through 6 where the at least one axial flow fan comprises a plurality of axial flow fans; and the axes of rotation of the plurality of axial flow fans are parallel.

Example 8 may include elements of any of examples 1 through 7 where the at least one mass comprises a first mass selectively, continuously, displaceable along a first pendulum having a first longitudinal axis extending radially outward from the payload member.

Example 9 may include elements of any of examples 1 through 8 and the system may further include: a first linear actuator operably coupled to the first mass, the first linear actuator to cause the displacement of the first mass along the first pendulum.

Example 10 may include elements of any of examples 1 through 9 where the first pendulum comprises a hinged pendulum pivotably coupled at a first end to the payload member, the hinged pendulum pivotably displaceable between: a first position in which the first longitudinal axis is parallel to the axis of rotation of the at least one axial flow fan; and a second position in which the first longitudinal axis is transverse to the axis of rotation of the at least one axial flow fan.

Example 11 may include elements of any of examples 1 through 10 and the control circuitry may further: cause the displacement of the first mass along the first longitudinal axis of the first pendulum; and cause a reversible displacement of the first pendulum between the first position and the second position.

Example 12 may include elements of any of examples 1 through 11 where the at least one mass comprises: a first mass selectively, continuously, displaceable along a first pendulum having a first longitudinal axis extending radially outward from the payload member; and a second mass selectively, continuously, displaceable along a second pendulum having a second longitudinal axis extending radially outward from the payload member, the second longitudinal axis orthogonal to the first longitudinal axis.

Example 13 may include elements of any of examples 1 through 12 and the system may further include: a first linear actuator operably coupled to the first mass, the first linear actuator to cause the displacement of the first mass along the first pendulum; and.

a second linear actuator operably coupled to the second mass, the second linear actuator to cause the displacement of the second mass along the second pendulum.

Example 14 may include elements of any of examples 1 through 13 where the first longitudinal axis is parallel to the axis of rotation of the at least one axial flow fan and the second longitudinal axis is transverse to the axis of rotation of the at least one axial flow fan.

Example 15 may include elements of any of examples 1 through 14 and the control circuitry may further: cause the selective, reversible, displacement of the first mass along the first longitudinal axis of the first pendulum via the first linear actuator; and cause the selective, reversible, displacement of the second mass along the second longitudinal axis of the second pendulum via the second linear actuator.

Example 16 may include elements of any of examples 1 through 15 and the control circuitry may further: cause a displacement of the first mass to a position on the first pendulum proximate a distal end of the first pendulum and a displacement of the second mass to a position proximate the payload member to orient the axis of rotation of the at least one axial-flow fan to cause a displacement of the system in a substantially vertical direction.

Example 17 may include elements of any of examples 1 through 16 and the control circuitry may further: cause a displacement of the first mass to a position on the first pendulum proximate the payload member and a displacement of the second mass to a position on the second pendulum proximate a distal end of the second pendulum to cause a displacement of the system in a substantially horizontal direction.

Example 18 may include elements of any of examples 1 through 17 where the at least one mass comprises a first mass selectively displaceable along at least a portion of a length of each of three orthogonal members disposed within the three-axis gimbal.

Example 19 may include elements of any of examples 1 through 18 where the platform further includes at least one energy storage device.

Example 20 may include elements of any of examples 1 through 19 where the platform further includes one or more image sensors.

Example 21 may include elements of any of examples 1 through 20 where the platform further includes one or more energy collection devices.

According to example 22, there is provided a multiple-mode robot controller. The controller may include: non-transitory storage circuitry; and control circuitry communicatively coupled to the non-transitory storage circuitry, the control circuitry to: cause a displacement of at least one mass within a gimbal, the gimbal disposed within an external skeleton, the displacement of the at least one mass to selectively, reversibly transition one or more thrust-producing propulsion units disposed within the gimbal between generation of a substantially horizontal thrust and generation of a substantially vertical thrust; and cause a rotation of an inertial member coupled to a payload member coupled to the gimbal.

Example 23 may include elements of example 22 where to cause a displacement of at least one mass within a gimbal the control circuitry may further: cause a displacement of a first mass along a first longitudinal axis of a first pendulum, the first longitudinal axis perpendicular to the payload member; and cause a displacement of a second mass along a second longitudinal axis of a second pendulum, the second longitudinal axis parallel to the payload member.

Example 24 may include elements of any of examples 22 or 23 where to cause the displacement of at least one mass within the gimbal to transition the one or more thrust-producing propulsion units disposed within the gimbal to generate the substantially vertical thrust the control circuitry may further: cause a displacement of the first mass along the first longitudinal axis to a distal end of the first pendulum remote from the payload member; and cause a displacement of the second mass along the second longitudinal axis to an end of the second pendulum proximate the payload member.

Example 25 may include elements of any of examples 22 through 24 where to cause the displacement of at least one mass within the gimbal to transition the one or more thrust-producing propulsion units disposed within the gimbal to generate the substantially horizontal thrust the control circuitry may further: cause a displacement of the first mass along the first longitudinal axis to an end of the first pendulum proximate the payload member; and cause a displacement of the second mass along the second longitudinal axis to a distal end of the second pendulum remote from the payload member.

According to example 26, there is provided a non-transitory storage device that includes instructions that, when executed by a multiple-mode robot controller, cause control circuitry within the controller to: cause a displacement of at least one mass within a gimbal, the gimbal disposed within an external skeleton, the displacement of the at least one mass to selectively, reversibly transition one or more thrust-producing propulsion units disposed within the gimbal between generation of a substantially horizontal thrust and generation of a substantially vertical thrust; and cause a rotation of an inertial member coupled to a payload member coupled to the gimbal.

Example 27 may include elements of example 26 where the instructions that cause the control circuitry to cause the displacement of the at least one mass within the gimbal further cause the control circuitry to: cause a displacement of a first mass along a first longitudinal axis of a first pendulum, the first longitudinal axis perpendicular to the payload member; and cause a displacement of a second mass along a second longitudinal axis of a second pendulum, the second longitudinal axis parallel to the payload member.

Example 28 may include elements of any of examples 26 or 27 where the instructions that cause the control circuitry to cause the displacement of the at least one mass within the gimbal to transition the one or more thrust-producing propulsion units disposed within the gimbal to generate the substantially vertical thrust further cause the control circuitry to: cause a displacement of the first mass along the first longitudinal axis to a distal end of the first pendulum remote from the payload member; and cause a displacement of the second mass along the second longitudinal axis to an end of the second pendulum proximate the payload member.

Example 29 may include elements of any of examples 26 through 28 where the instructions that cause the control circuitry to cause the displacement of the at least one mass within the gimbal to transition the one or more thrust-producing propulsion units disposed within the gimbal to generate the substantially horizontal thrust further cause the control circuitry to: cause a displacement of the first mass along the first longitudinal axis to an end of the first pendulum proximate the payload member; and cause a displacement of the second mass along the second longitudinal axis to a distal end of the second pendulum remote from the payload member.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments.

What is claimed is:

1. A robotic system comprising:

an external skeleton;

a gimbal disposed at least partially within the external skeleton;

a payload member disposed in the interior space of the gimbal and operably coupled to the gimbal;

at least one propulsion unit physically coupled to the payload member and disposed within the gimbal; and at least one mass disposed within the gimbal, the at least one mass controllably displaceable along at least one of three orthogonal axes;

wherein the external skeleton comprises a spherical external skeleton; wherein the gimbal comprises a three-axis gimbal disposed at least partially within the spherical external skeleton, further comprising:

a flywheel operably coupled to the payload member; wherein the at least one propulsion unit comprises at least one axial flow fan having an axis of rotation, the at least one axial flow fan operably coupled to the payload member; and wherein the at least one mass comprises a first mass selectively displaceable along at least a portion of a length of each of three orthogonal members disposed within the three-axis gimbal.

2. The system of claim 1 wherein the at least one axial flow fan comprises a plurality of axial flow fans; and the axes of rotation of the plurality of axial flow fans are parallel.

3. The system of claim 1 wherein the at least one mass comprises a first mass selectively, continuously, displaceable along a first pendulum having a first longitudinal axis extending radially outward from the payload member.

4. The system of claim 3 further comprising:

a first linear actuator operably coupled to the first mass, the first linear actuator to cause the displacement of the first mass along the first pendulum.

5. The system of claim 3 wherein the first pendulum comprises a hinged pendulum pivotably coupled at a first end to the payload member, the hinged pendulum pivotably displaceable between:

a first position in which the first longitudinal axis is parallel to the axis of rotation of the at least one axial flow fan; and a second position in which the first longitudinal axis is transverse to the axis of rotation of the at least one axial flow fan.

6. The system of claim 1 wherein the at least one mass comprises:

a first mass selectively, continuously, displaceable along a first pendulum having a first longitudinal axis extending radially outward from the payload member; and a second mass selectively, continuously, displaceable along a second pendulum having a second longitudinal axis extending radially outward from the payload member, the second longitudinal axis orthogonal to the first longitudinal axis.

7. The system of claim 6 further comprising:

a first linear actuator operably coupled to the first mass, the first linear actuator to cause the displacement of the first mass along the first pendulum; and a second linear actuator operably coupled to the second mass, the second linear actuator to cause the displacement of the second mass along the second pendulum.

8. The system of claim 6 wherein the first longitudinal axis is parallel to the axis of rotation of the at least one axial flow fan and the second longitudinal axis is transverse to the axis of rotation of the at least one axial flow fan.

* * * * *